Feb. 13, 1968  A. G. HOP ET AL  3,368,402

VARIABLE AREA FLOWMETER

Filed Dec. 30, 1965

INVENTORS:
ADRIANUS G. HOP
JELLE A. LANDSTRA

BY:

THEIR ATTORNEY

United States Patent Office 3,368,402
Patented Feb. 13, 1968

3,368,402
VARIABLE AREA FLOWMETER
Adrianus G. Hop and Jelle A. Landstra, Amsterdam, Netherlands, assignors to Shell Oil Company, New York, N.Y., a corporation of Delaware
Filed Dec. 30, 1965, Ser. No. 517,738
2 Claims. (Cl. 73—208)

ABSTRACT OF THE DISCLOSURE

A liquid flowmeter having a cylinder with a rectangular discharge port and a piston which is movable in the cylinder to change the upper bound of the port to vary the area of the port according to the flow rate. The underside or lower bound of the discharge port is formed by a sharp edge which provides a wider range of linearity for measuring the flow rate.

---

The invention relates to a flowmeter for liquids and more particularly pertains to a flowmeter provided with a cylinder with means for the supply and means for the discharge of the liquid and with a floating piston, the area of the discharge port being variable in accordance with the movement of the piston. Meters of this type are commonly called piston-areameters or variable area flowmeters.

A description of such meters occurs, for example, in the "Handbook of Instrumentation and Controls" by H. P. Kallen (1961), pp. 5-48 and 5-49 and in the U.S. Patent No. 2,459,689 issued to C. K. Broderson, the disclosure of which is incorporated herein. A piston-areameter incorporates a cylinder with a movable piston, the axis of the cylinder generally being in the vertical position. The flow of liquid to be measured is passed into the cylinder so that it impinges against the bottom or underside of the piston and then out of a discharge port. The area of the discharge port is variable due to the fact that the piston can cover the whole or part of an opening in the lateral wall of the cylinder. Since the pressure differential across such meters remains constant, the area of the discharge port depends on the rate of flow of the liquid and is approximately proportional to said rate of flow.

By giving the piston a certain weight and arranging for the discharge port to be rectangular in shape with two sides parallel to the axis of the cylinder, within a certain range a linear relationship between the travel of the piston and the mass flow rate of the liquid is obtained. By rectangular shaped port it is here understood to mean an opening whose projection on a plane surface parallel to the axis of the cylinder is a rectangle. With the aid of electric, magnetic, optical, mechanical or pneumatic means or with the aid of combinations of these means the position of the piston can be translated into a signal that can be used for direct reading, for recording or for further processing such as integration. These meters can be manufactured to have a measuring range of up to several hundred tons per hour and are therefore of great importance for factories and stores of chemical and petroleum products and of foods and allied products.

Special measures relating to details of the construction are necessary to obtain a large accuracy in the linearity over as large a measuring range as possible. Thus, the U.S. Patent No. 2,674,880 mentioned above describes the application of axial baffles or tubes in the liquid supply and the liquid discharge lines of the cylinder for the suppression of turbulent flows having an adverse influence on the accuracy of the meter in the upper portion of its measuring range. The position of the inlet port and the shape of the inlet and the discharge lines in the proximity of the cylinder may vary, as appears from the portion of the book by H. P. Kallen referred to hereinbefore.

It has been found, however, that piston-areameters in the range of low loads or flow rates still show large deviations from the linear relationship between the travel of the piston and the mass flow rate of the liquid, i.e., the meters tend to read a lower value than the actual flow due to insufficient movement of the piston. As a result of this large deviation at the low end, the usable measuring range of the meter is measurably decreased.

The invention provides a simple means which makes it possible to obtain a considerable extension of the linear measuring range towards lower values. Briefly, the invention relates to a flowmeter for liquids provided with a cylinder having means for the supply and the discharge of the liquid; a piston, the position of which varies the area of the discharge port; and means for detecting the position of the piston. The discharge port is rectangular in shape and bounded by the underside of the piston and by three sides of an opening in the lateral wall of the cylinder. Two sides of the opening are parallel to the axis of the cylinder, while the third side, which comprises the underside or lower bound of the rectangular discharge port is formed by a sharp edge. Preferably, the sharp edge is located in the running surface of the cylinder wall, i.e., the inner surface. This location involves that the wall of the cylinder from the sharp edge slope downwardly and outwardly Also, for reasons of construction, it is advantageous for the vertex of the sharp edge to form an angle between 30 and 45 degrees.

With the known piston-areameters the bound of the discharge port in the lateral wall is formed not by a line but by a flat edge due to the finite thickness of the cylinder wall. The favorable effect of the sharp edge according to the invention on the linearity of the meter is a result of the fact that the resistance against flow of the liquid is influenced by the sharp edge. The sharp edge causes the coefficient of resistance to increase, which results in a larger piston travel for a given flow rate. Since at a low position of the piston, hence, at a low rate of flow, the sharp edge constitutes a larger portion of the bound of the discharge port than at a high position of the piston, the means according to the invention shifts the lower limit of the usable measuring range of a piston-areameter towards lower values, while at the same time not adversely affecting the linearity of the upper portion of the measuring range. The linearity of the meter thus becomes better over a wider range of flow rates.

The invention and the advantages thereof will be more clearly understood from the following description thereof taken in conjunction with the accompanying figures wherein.

Figure 1:
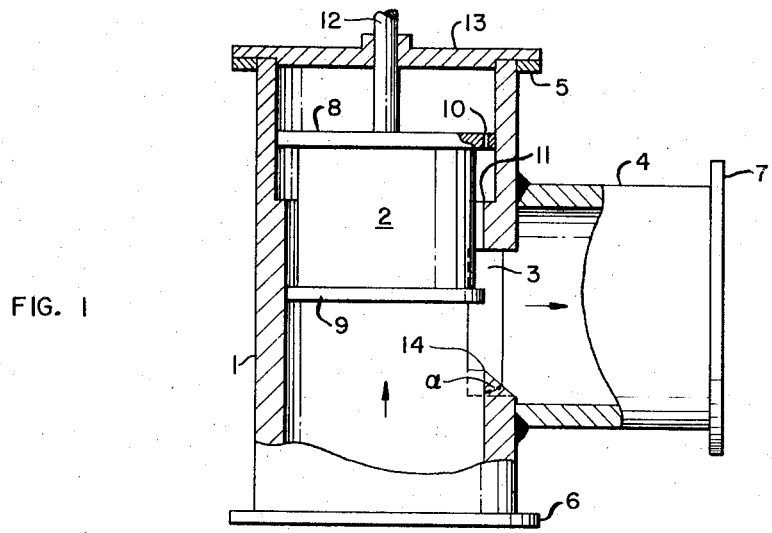
FIGURE 1 is an elevation view, partly in cross-section, of a variable area flowmeter according to the invention.

Referring now to FIGURE 1 there is shown a variable area or piston-area meter which comprises essentially a vertical cylinder 1 having a piston 2 slidably mounted therein for vertical reciprocation. An orifice 3, preferably rectangular but at least having two sides parallel to the longitudinal axis of the cylinder and the lower side thereof perpendicular to the two parallel sides, is provided in the wall of the cylinder 1. The orifice 3 is in register with the axis of a length of pipe 4 which is fixedly secured in a fluid tight manner, for example, by welding, to the outer surface of the cylinder 1. The two open ends of the cylinder 1 and the free end of the pipe 4 are respectively provided with flanges 5, 6 and 7 or other suitable means for connecting the cylinder 1 and its affixed pipe 4 into a pipeline or to other equipment as desired.

In order to reduce the friction between the piston 2 and the inner or running surface of the wall or cylinder 1, the major portion of the length of the piston 2 is undercut or reduced in diameter to form respective upper and lower radially extending flanges or rings 8 and 9, the outer surfaces of which then provide the only frictional contact between the piston 2 and the wall of the cylinder 1. The upper ring 8 is preferably provided with one or more openings 10 to form a passageway for fluid to flow into the space above the piston 2, thereby exerting a downward force on the piston, in order to aid in the piston 2 attaining an equilibrium position during flow measurements.

Formed or mounted on the inner surface of the wall of cylinder 1 at a level above the orifice 3 is a seat or inwardly extending flange 11 which is adapted to engage the lower surface of the upper ring 8. The seat 11 is positioned so that when it is in engagement with the ring 8, the piston 2 will just close off the orifice 3, i.e., no flow of fluid through the variable area flow meter occurs.

Connected to the piston 2 in any conventional manner is a piston rod 12 which extends upwardly from the center of the piston through a top closure 13, e.g., a blank flange, for the cylinder 1. The length of piston rod 12 extending above the flange 13 can be calibrated in flow readings or preferably is connected to a flow indicating and/or recording device (not shown) of a desired construction, i.e., electrical, hydraulic, etc.

In operation, the fluid whose flow is to be measured enters the cylinder 1 in the direction of the arrow and is directed against the under side of the piston 2. The flowing fluid exerts an upward force on the piston, thereby raising the piston and exposing a portion of the orifice 3 and forming a rectangular discharge port from the cylinder 1 which discharge port is bounded by the underside of the piston 2 and three sides of the orifice 3. The fluid then flows out of the meter via the pipe 4 and to any equipment connected to the flange 7. In each case as the fluid flows through the cylinder 1 and out of the orifice 3, the piston 2 will raise a distance sufficient to cause the downward forces exerted on the piston 2, i.e., the weight of the piston and the pressure caused by the fluid in the space above the piston, to equal the upward force on the piston produced by the pressure of the flowing fluid. Thus, the piston 2 moves up and down with the fluid inlet pressure, thereby varying the area of the discharge port, until the equilibrium position is attained, whereby the position of the piston may be used as an indication of the fluid inlet pressure.

The variable area flow meter or piston area meter thus far described is basically of standard construction as understood in the art. As indicated above however, it has been found that variable area flow meter of standard design does not exhibit a very linear relationship between the piston travel and the flow rate at low values of flow and hence have not generally been used where low flow rates are encountered. In order to extend the useful measuring range of the variable area meter, according to the invention the lower or underside of the orifice 3 is provided with a sharp edge as indicated by the reference numeral 14. Preferably as indicated in FIGURE 1, the sharp edge is located in the running surface or inner surface of the cylinder wall and forms a vertex angle, $\alpha$, between 30 and 45 degrees. It is to be understood, however, that the sharp edge may be formed at different locations along the thickness of the lower or underside of the orifice 3. It is further to be understood that the sides of the orifice 3 that are parallel to the axis of the cylinder may be flat, sharp or rounded.

With a piston-areameter according to the invention a number of measurements have been performed, the results of which are represented in Examples I and II below and in the appertaining FIGURES 2 and 3.

EXAMPLE I

Flow measurements were carried out with gas oil at a temperature of about 20° C., viscosity 4 cs., specific gravity 0.89, with a piston-areameter of the following specification:

Capacity, about _____tons/h__ 12
Diameter of piston _____mm__ 88
Maximum travel of the piston _____mm__ 60
Width of the discharge port _____mm__ 38

In order to bring out the magnitude of the favorable effect of the meter according to the invention as compared with a conventional meter, two series of measurements were performed, namely one with a meter with the lower bound of the discharge port formed by a sharp edge, according to the invention, and one with the same meter with the lower bound of the discharge port formed by a flat edge, i.e., the cylinder wall thickness.

Figure 2:
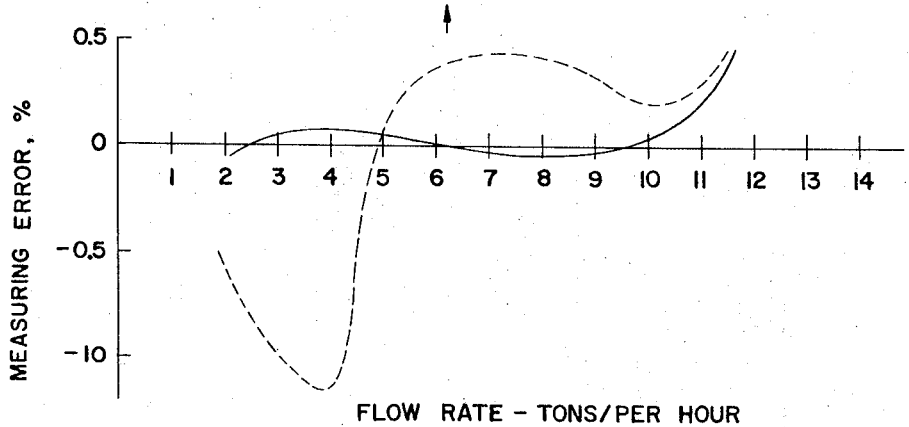
FIGURE 2 is a graph indicating the percent measuring error or deviation from linearity of a variable area flowmeter according to the prior art and the same flowmeter modified according to the invention.
Figure 3:
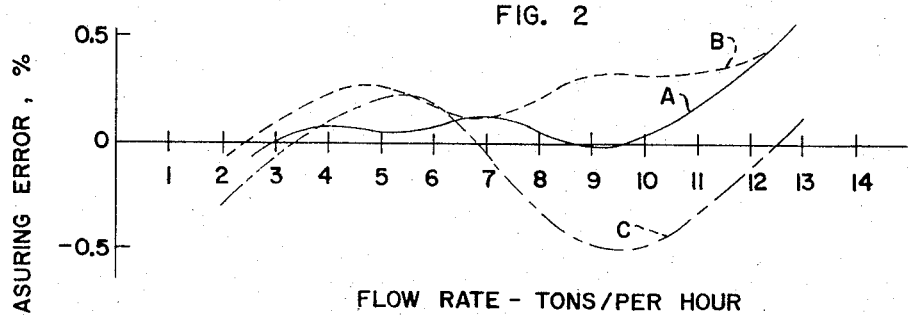
FIGURE 3 is a graph indicating the percent measuring error of a variable area flowmeter modified according to the invention for a number of liquids of differing viscosities.

The results are represented in FIGURE 2 wherein the measuring error or deviation from linearity in percent $$\left(\frac{\text{measured value} - \text{actual value}}{\text{actual value}} \times 100\right)$$

is plotted against the flow rate in tons/h. The dotted line represents the results for the meter with the flat edge and the solid line those for the meter with the sharp edge (45°). If a deviation of ±0.5% is permitted, it can easily be seen that the lower limit of the measuring range is shifted from 4.5 tons/h. to less than 2 tons/h., resulting in the usable measuring range being increased by at least 35%.

EXAMPLE II

Measurements were also performed with liquids differing in viscosity with a piston-areameter according to the invention and as described in Example I. The results are given in FIGURE 3 wherein Curve A was obtained with water, viscosity 1 cs., specific gravity 1.0; Curve B with a lubricating oil, viscosity 17 cs., specific gravity 0.90; and Curve C with a lubricating oil, viscosity 40 cs., specific gravity 0.88. From these measurements it is obvious that the accuracy of a piston-areameter according to the invention is within a very vide measuring range not adversely influenced by the viscosity and the specific gravity of the liquid.

We claim as our invention:

1. In a liquid flowmeter of the variable area type having a vertical cylinder closed at its upper end; a piston movable along the axis of said cylinder in sliding contact with the inner wall thereof; means for detecting the position of said piston; inlet means for introducing liquid into said cylinder below said piston; and a rectangular shaped discharge port having a variable area, said discharge port being bounded by the underside of said piston and by three sides of an orifice in the lateral wall of said cylinder with two of said sides being parallel to the axis of said cylinder and the other of said sides providing the lower bound of said discharge port, the improvement comprising: said third side of said discharge port being formed by a sharp edge, said sharp edge being located on the inner surface of the cylinder.

2. A flowmeter according to claim 1 wherein the vertex of the sharp edge lies within the range between 30 and 45°.

References Cited
UNITED STATES PATENTS

| | | | |
|---|---|---|---|
| 1,677,411 | 7/1928 | Scoville | 73—208 |
| 2,052,022 | 8/1936 | Fisher | 73—208 |
| 2,400,108 | 5/1946 | Elowson | 73—208 |
| 2,674,880 | 4/1954 | Broderson | 73—207 |

RICHARD C. QUEISSER, *Primary Examiner.*

JAMES J. GILL, *Examiner.*

EDWARD D. GILHOOLY, *Assistant Examiner.*